(12) United States Patent
Nodono (10) Patent No.: US 7,862,921 B2
(45) Date of Patent: Jan. 4, 2011

(54) PROCESS FOR CONTINUOUSLY PRODUCING POLYMER ELECTROLYTE MEMBRANE AND PRODUCING APPARATUS THEREFOR

(75) Inventor: Mitsunori Nodono, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1159 days.

(21) Appl. No.: 10/549,921

(22) PCT Filed: Mar. 24, 2004

(86) PCT No.: PCT/JP2004/004068

§ 371 (c)(1),
(2), (4) Date: Sep. 20, 2005

(87) PCT Pub. No.: WO2004/088678

PCT Pub. Date: Oct. 14, 2004

(65) Prior Publication Data

US 2007/0009776 A1    Jan. 11, 2007

(30) Foreign Application Priority Data

Mar. 28, 2003 (JP) .............................. 2003-090840
Mar. 28, 2003 (JP) .............................. 2003-090841
Jun. 2, 2003  (JP) .............................. 2003-157052

(51) Int. Cl.
    *H01M 8/10*    (2006.01)
(52) U.S. Cl. .............................. 429/30; 429/27; 429/33; 427/115; 502/101; 521/27
(58) Field of Classification Search .................. 429/30, 429/33, 27; 427/115; 502/101; 521/27
See application file for complete search history.

(56) References Cited

U.S. PATENT DOCUMENTS

| 5,910,378 A | * | 6/1999 | Debe et al. ................... 429/483 |
| 6,054,230 A | | 4/2000 | Kato |
| 6,589,690 B1 | * | 7/2003 | Sato et al. ................... 429/162 |
| 2002/0045085 A1 | | 4/2002 | Formato et al. |
| 2002/0187401 A1 | | 12/2002 | Lee et al. |
| 2003/0059657 A1 | * | 3/2003 | Stone et al. ................... 429/30 |

(Continued)

FOREIGN PATENT DOCUMENTS

JP          6-29032           2/1994

(Continued)

OTHER PUBLICATIONS

Office Action dated Jun. 9, 2009 received in counterpart Japan application.

(Continued)

*Primary Examiner*—Peter D. Mulcahy
*Assistant Examiner*—Henry Hu
(74) *Attorney, Agent, or Firm*—Foley & Lardner LLP

(57) ABSTRACT

The present invention provides a process for producing a polymerelectrolyte membrane comprising the steps of coating a solution of a polymerelectrolyte on at least one surface of a porous substrate and laminating the coated porous substrate and a supporting material while applying a tension F (kg/cm) in a range of the following expression (A)

$$0.01 \leq F \leq 10 \quad (A)$$

to the coated porous substrate. According to the present invention, a polymerelectrolyte composite membrane in which wrinkling and the like are suppressed and whose appearance is excellent can be continuously produced.

7 Claims, 4 Drawing Sheets

U.S. PATENT DOCUMENTS

2003/0152820 A1    8/2003    Kato
2003/0158273 A1*    8/2003    Kosako et al. ............... 521/27

FOREIGN PATENT DOCUMENTS

| JP | 06-029032 | * | 2/1994 |
| JP | 08-162132 | * | 6/1996 |
| JP | 8-162132 | | 6/1996 |
| JP | 08-162132 A | | 6/1996 |
| JP | 8-329962 | | 12/1996 |
| JP | 08-329962 | * | 12/1996 |
| JP | 2000-277131 A | | 10/2000 |
| JP | 2001-35510 | | 2/2001 |
| JP | 2002-216795 | | 8/2002 |
| JP | 2003-528420 A | | 9/2003 |
| JP | 2004-506542 A | | 4/2004 |
| WO | WO-2004/088678 A1 | * | 10/2004 |

OTHER PUBLICATIONS

Office Action dated Jun. 9, 2009 received in counterpart Japan application 2003-157052.

Decision of Refusal dated Nov. 10, 2009 received in counterpart Japan application 2003-090841.

* cited by examiner

PROCESS FOR CONTINUOUSLY PRODUCING POLYMER ELECTROLYTE MEMBRANE AND PRODUCING APPARATUS THEREFOR

This application is a National Stage Application of PCT/JP2004/004068, filed Mar. 24, 2004, which claims priority from Japanese Application Nos. 2003-090840 and 2003-090841, both filed Mar. 28, 2003 and 2003-157052, filed Jun. 2, 2003. The entire contents of each of the aforementioned applications are incorporated herein by reference.

TECHNICAL FIELD

The present invention relates to a continuous process for producing a polymerelectrolyte membrane wherein a polymerelectrolyte is impregnated into voids of a porous substrate. More detail, the present invention relates to a continuous process for producing a polymerelectrolyte membrane characterized by coating a porous substrate with a solution of a polymerelectrolyte and, laminating the coated porous substrate and a supporting material by using a roll while applying a tension in a specific range to the coated porous substrate.

In addition, the present invention relates to an apparatus to be employed for continuously producing the above-mentioned polymerelectrolyte membrane.

BACKGROUND ART

In recent years, a fuel cell (a solid polymerelectrolyte type fuel cell) employing a polymer membrane having proton conductivity as an electrolyte has been predominant as a use for a fuel cell of a power source to be mounted on vehicles and the like, since such electrolyte is operated at low temperatures, has high power density and is capable of being downsized.

A method of impregnating a polymerelectrolyte into voids of a porous substrate has been proposed as a method for giving mechanical strength, durability and the like to a polymerelectrolyte membrane (Japanese Patent Application Laid-Open No. 6-29032).

A method of dipping a porous substrate in a solution of a polymerelectrolyte, an method for applying a solution of a polymerelectrolyte to a porous substrate and the like have been proposed as a method of impregnating a polymerelectrolyte into voids of a porous substrate (Japanese Patent Application Laid-Open No. 8-329962).

However, in the above-mentioned continuous processes for producing a polymerelectrolyte membrane, for example, when a porous substrate is previously disposed on a supporting material and coated with a solution of a polymerelectrolyte, it is considered that swelling and slackening are caused on the porous substrate, and consequently wrinkling and the like are occasionally caused in appearance of a product to be obtained, resulting in deterioration external appearance.

An object of the present invention is to provide a process for continuously producing a polymerelectrolyte membrane in which wrinkling is suppressed and whose appearance is excellent.

DISCLOSURE OF THE INVENTION

Through earnest studies for continuously producing a polymerelectrolyte membrane in which wrinkling and the like are and whose appearance is excellent, the present inventors have completed the present invention through further various studies by finding that the object is achieved by coating a porous substrate with a solution of a polymerelectrolyte, and laminating the coated porous substrate and a supporting material by using a roll while applying a tension in a specific range to the coated porous substrate.

The present invention relates to a process for continuously producing a polymerelectrolyte membrane wherein a polymerelectrolyte is impregnated into voids of a porous substrate, namely, a continuous process for producing a polymerelectrolyte membrane comprising the steps of: coating a solution of a polymerelectrolyte on at least one surface of a porous substrate, and laminating the coated porous substrate and a supporting material while applying a tension F (kg/cm) to the coated porous substrate in a range of the following expression (A)

$$0.01 \leq F \leq 10 \tag{A}$$

Further, the present invention provides a fuel cell and the like comprising the polymerelectrolyte membrane obtained by the above-mentioned process.

Also, the present invention relates to an apparatus for continuously producing a polymerelectrolyte membrane, comprising a first coating means for coating a solution of a polymerelectrolyte on a porous substrate which is being conveyed, a tension applying means for applying a tension F (kg/cm) in a range of $0.01 \leq F \leq 10$ to the coated porous substrate, and a laminating means for laminating a supporting material and the porous substrate which is coated with the solution of a polymerelectrolyte and applied the tension to give a laminate.

BRIEF DESCRIPTION OF THE DRAWINGS

FIG. 3 (a) is a cross-sectional view showing a laminate 3b obtained in FIG. 1. FIG. 3 (b) is a cross-sectional view showing a laminate 3e obtained in FIG. 2.

REFERENCE NUMERALS

1: a porous substrate, 2: a supporting material, 70: a solution of a polymerelectrolyte, 65: a first coating unit (a first coating means), 10: a feeder (a tension applying means), 30: a laminating roll (a laminating means), 3a, 3b, 3d and 3e: laminate, 40: a drying unit (a drying means), 55: a second coating unit (a second coating means), 100 and 200: apparatuses for continuously producing a polymerelectrolyte membrane

PREFERABLE MODE FOR CARRYING OUT THE INVENTION

The present invention is hereinafter detailed.

A porous substrate to be used in the present invention is a substrate which is impregnated with a polymerelectrolyte, and is used for improving strength, flexibility and durability of a polymerelectrolyte membrane.

The substrate is so porous as to satisfy the above-mentioned purpose of use, and the shape and material thereof are not limited, for example, including a porous membrane, a woven fabric, a nonwoven fabric and a fibril. In the case of using a polymerelectrolyte membrane as a diaphragm of a solid polymerelectrolyte type fuel cell, the thickness of the porous substrate is typically 1 to 100 μm, preferably 3 to 30 μm and more preferably 5 to 20 μm. The pore diameter of the porous substrate is typically 0.01 to 100 μm, preferably 0.02 to 10 μm, and the porosity thereof is 20 to 98%, preferably 40 to 95%.

When thickness of a porous substrate is too thin, the reinforcement effect of strength of a polymerelectrolyte membrane or the effect of giving flexibility and durability may be insufficient to easily cause gas leakage (gas cross leak). When thickness thereof is too thick, its electric resistance may increase, and the performance of a diaphragm may be insufficient in the case of using an obtained polymerelectrolyte membrane as a diaphragm of a solid polymer type fuel cell. When pore diameter thereof is too small, the filling of a solid polymerelectrolyte may become difficult. When pore diameter is too large, the effect of reinforcing a polymerelectrolyte membrane may be small. When porosity thereof is too low, the resistance of a polymerelectrolyte membrane may increase, when porosity is too high, the strength of a porous substrate may become weak to reduce the effect of reinforcing.

With regard to a porous substrate, an aliphatic polymer, an aromatic polymer or a fluorine-containing polymer is preferably used from the viewpoint of heat resistance and the effect of reinforcing physical strength.

Here, examples of the aliphatic polymer include polyethylene, polypropylene, polyvinyl alcohol and an ethylene-vinyl alcohol copolymer, and are not limited thereto. Polyethylene is a generic term of an ethylene-based polymer having repeating unit derived from ethylene in a main chain, and includes, for example, linear high-density polyethylene (HDPE), low-density polyethylene (LDPE) and a copolymer of ethylene and another monomer, which includes a copolymer of ethylene and an α-olefin, such as linear low-density polyethylene (LLDPE), ultra-high-molecular-weight polyethylene and the like. Polypropylene herein described is a generic term of a propylene-based polymer having repeating unit derived from propylene in a main chain, and includes a propylene homopolymer, a block copolymer and a random copolymer of propylene and ethylene and/or an α-olefin such as 1-butene.

Examples of the aromatic polymer include polyester, polyethylene terephthalate, polycarbonate, polyimide and polysulfone.

Examples of a fluorine-containing polymer include a thermoplastic resin having at least one carbon-fluorine bond in its molecule, and preferable examples of the fluorine-containing polymer include a polymer in which all or most of hydrogen atoms of the above-mentioned aliphatic polymer are substituted with fluorine atoms.

Examples thereof include polytrifluoroethylene, polytetrafluoroethylene, polychlorotrifluoroethylene, poly(tetrafluoroethylene-hexafluoropropylene), poly(tetrafluoroethylene-perfluoroalkyl ether) and polyvinylidene fluoride, and are not limited thereto. Among them, polytetrafluoroethylene and poly(tetrafluoroethylene-hexafluoropropylene) are preferable, and particularly polytetrafluoroethylene is preferable. With regard to these fluororesins, fluororesins having an average molecular weight of 100,000 or more are preferable from the viewpoint of mechanical strength.

A polymerelectrolyte to be used in the present invention is typically a solvent-soluble polymer having ion exchange groups, for example, cation exchange groups such as —$SO_3H$, —COOH, —$PO(OH)_2$, —POH(OH), —$SO_2NHSO_2$— and -Ph(OH) wherein Ph denotes a phenyl group, and anion exchange groups such as —$NH_2$, —NHR, —NRR', —NRR'R''$^+$ and —$NH_3^+$ wherein R denotes an alkyl group, a cycloalkyl group, an aryl group and the like. With regard to these groups, a part or all thereof may form a salt with counterions.

Examples of such a polymerelectrolyte include (A) a polymerelectrolyte wherein a sulfonic acid group and/or a phosphonic acid group are introduced into a main chain of a polymer comprising an aliphatic hydrocarbon; (B) a polymerelectrolyte wherein a sulfonic acid group and/or a phosphonic acid group are introduced into a polymer comprising an aliphatic hydrocarbon in which a part or all of hydrogen atoms of the main chains are substituted with fluorine atoms; (C) a polymerelectrolyte wherein a sulfonic acid group and/or a phosphonic acid group are introduced into a polymer whose main chain has an aromatic ring; (D) a polymerelectrolyte wherein a sulfonic acid group and/or a phosphonic acid group are introduced into a polymer substantially containing no carbon atom in its main chain, such as polysiloxane and polyphosphazene; (E) a polymerelectrolyte wherein a sulfonic acid group and/or a phosphonic acid group are introduced into a copolymer comprising repeating units of any two kinds or more selected from repeating units composing polymers before a sulfonic acid group and/or a phosphonic acid group are introduced into the above-mentioned (A) to (D) polymerelectrolytes; and (F) a polymerelectrolyte wherein acidic compounds such as sulfuric acid or phosphoric acid are introduced through an ionic bond into a polymer containing a nitrogen atom in a main chain or a side chain.

Here, examples of the polymerelectrolyte of the above-mentioned (A) include polyvinylsulfonic acid, polystyrene sulfonic acid and poly(α-methyl styrene)sulfonic acid.

Examples of the polymerelectrolyte of the above-mentioned (B) include a polymer having perfluoroalkyl sulfonic acid in its side chain, whose main chain is a perfluoroalkane, such as Nafion (a registered trademark of E.I. du Pont de Nemours Company, and so forth), a sulfonic acid-type polystyrene-graft-ethylene-tetrafluoroethylene copolymer (ETFE, for example, Japanese Patent Application Laid-Open No. 9-102322) wherein a hydrocarbon having a sulfonic acid group is introduced as the side chain into the main chain made by the copolymerization of a fluorine-substituted hydrocarbon vinyl monomer and a hydrocarbon vinyl monomer, and a sulfonic acid-type poly(trifluorostyrene)-graft-ETFE membrane (for example, U.S. Pat. No. 4,012,303 and U.S. Pat. No. 4,605,685) wherein α,β,β-trifluorostyrene is grafted to a polymer comprising a copolymer of a fluorine-substituted hydrocarbon vinyl monomer and hydrocarbon vinyl monomer, and a sulfonic acid group is introduced thereto to obtain a solid polymerelectrolyte membrane.

Examples of a polymerelectrolyte of the above-mentioned (C) include a polymerelectrolyte wherein a sulfonic acid group and/or a phosphonic acid group are introduced into a polymer containing a hetero atom such as an oxygen atom in its main chain, for example, including polymerelectrolytes wherein a sulfonic acid group is introduced into polymers such as polyether ether ketone, polysulfone, polyether sulfone, poly(arylene ether), polyimide, poly((4-phenoxybenzoyl)-1,4-phenylene), polyphenylene sulfide and polyphenylquinoxalene, sulfoarylated polybenzimidazole, sulfoalkylated polybenzimidazole, phosphoalkylated polybenzimidazole (for example, Japanese Patent Application Laid-Open No. 9-110982), and phosphonated poly(phenylene ether) (for example, J. Appl. Polym. Sci., 18, 1969 (1974)).

Examples of a polymerelectrolyte of the above-mentioned (D) include a polymerelectrolyte wherein a sulfonic acid group is introduced into polyphosphazene, and polysiloxane having a phosphonic acid group, described in Polymer Prep., 41, No. 1, 70 (2000).

Examples of the polymerelectrolyte of the above-mentioned (E) include a polymerelectrolyte wherein a sulfonic acid group and/or a phosphonic acid group are introduced into a random copolymer, a polymerelectrolyte wherein a sulfonic acid group and/or a phosphonic acid group are introduced into an alternating copolymer, and a polymerelectrolyte wherein a sulfonic acid group and/or a phosphonic acid group are introduced into a block copolymer. Examples of the polymerelectrolyte wherein a sulfonic acid group is introduced into a random copolymer include a sulfonated polyether sulfone-dihydroxybiphenyl copolymer (for example, Japanese Patent Application Laid-Open No. 11-116679).

Examples of the polymerelectrolyte of the above-mentioned (F) include polybenzimidazole containing phosphoric acid, described in Japanese Patent National Publication No. 11-503262.

Examples of the block copolymer, in which a sulfonic acid group and/or a phosphonic acid group are introduced, included in a polymerelectrolyte of the above-mentioned (E), include a block having a sulfonic acid group and/or a phosphonic acid group, described in Japanese Patent Application Laid-Open No. 2001-250567.

The weight-average molecular weight of the polymerelectrolyte to be used for the present invention is typically approximately 1000 to 1000000, and the ion exchange group equivalent weight is typically approximately 500 to 5000 g/mol.

The polymerelectrolyte of (C) wherein a sulfonic acid group and/or a phosphonic acid group are introduced into a polymer whose main chain has an aromatic ring is preferably used among the above-mentioned (A) to (F) polymerelectrolytes.

The polymerelectrolyte may contain additives to be used for a polymer, such as a plasticizer, a stabilizer and a release agent.

A coating solution to be used in the present invention is a solution of the above-mentioned polymerelectrolyte mixed with a solvent.

A solvent to be used is not particularly limited if it can dissolve a polymerelectrolyte and be thereafter removed, for example, including aprotic polar solvents such as N,N-dimethylformamide, N,N-dimethylacetamide, N-methyl-2-pyrrolidone and dimethyl sulfoxide, chlorine-based solvents such as dichloromethane, chloroform, 1,2-dichloroethane, chlorobenzene and dichlorobenzene, alcohols such as methanol, ethanol and propanol, and alkylene glycol monoalkyl ethers such as ethylene glycol monomethyl ether, ethylene glycol monoethyl ether, propylene glycol monomethyl ether and propylene glycol monoethyl ether. These may be used singly or in a mixture of two kinds or more solvents. Among these solvents, dimethylacetamide, a mixed solvent of dichloromethane/methanol, dimethylformamide and dimethyl sulfoxide are preferable from the viewpoint of solubility of the above-mentioned polymerelectrolyte therein.

In the case of producing a polymerelectrolyte membrane by the process for producing a polymerelectrolyte membrane as mentioned later, a solution of a polymerelectrolyte after being applied is repelled on a porous substrate and an application solution is not applied uniformly to cause solution drips, so that the thickness precision of an obtained polymerelectrolyte is not sufficient and stress is concentrated on a thin part in thickness to easily rupture a polymerelectrolyte membrane. From such a viewpoint, with regard to preferable viscosity of a coating solution in the present invention, $\eta$ (cps: centipoise) satisfies $30 \leq \eta \leq 5000$.

Here, viscosity $\eta$ is a value measured at a relative humidity of 50% or less by using a BL type viscometer (manufactured by Tokyo Keiki Co., Ltd.). The viscosity is more preferably $100 \leq \eta \leq 3000$, most preferably $300 \leq \eta \leq 1500$.

The concentration C (% by weight) of a coating solution is preferably 1 or more, more preferably 6 or more from the viewpoint that a polymerelectrolyte is sufficiently impregnated into voids of a porous substrate when a coating solution is dried. The concentration is preferably 50 or less, more preferably 35 or less from the viewpoint of controlling coating thickness.

A polymerelectrolyte is impregnated into voids of a porous substrate by using the above-mentioned solution of a polymerelectrolyte as a coating solution to coat a porous substrate therewith. Here, a coating method is preferred to be a method capable of achieving desired coating thickness, for example, including a method employing a roll coater, a comma coater, a doctor blade coater, a lip coater, a wire bar, a gravure coater, a bar coater and the like, a method of casting, called a casting method, by extruding a coating solution from a die and the like set at a desired clearance so as to get desired coating thickness, and a method of immersing a porous substrate in a coating solution.

In the case of coating one surface of a porous substrate or one surface of the after-mentioned supporting material with a coating solution, the coating is preferred to be performed by at least one selected from the above-mentioned methods. In the case of coating both surfaces of a porous substrate, a coating method includes a method where coating only one surface is performed and coating the other surface is performed after white, and a method of coating both surfaces simultaneously. A method of coating both surfaces of a porous substrate simultaneously or separately includes a method of coating in a combination of the above-mentioned coating methods, such as a combination of a method employing a coater and a method of casting, a method of immersing in a coating solution to thereafter adjust a thickness through a gap set at a desired clearance, and the like.

In the case of coating a coating solution on a porous substrate, which is not coated with a coating solution, the coating is performed in a state such that a porous substrate does not contact with a supporting material. Thereafter, a supporting material and the coated porous substrate are laminated while applying a tension F (kg/cm) in a range of the following expression (A)

$$0.01 \leq F \leq 10 \tag{A}$$

to the coated porous substrate.

The laminating while applying the above-mentioned tension prevents wrinkling and the like from being caused in appearance of a product, and allows a product excellent in appearance to be continuously produced. Examples of the laminating method include a laminating method by a roll and the like.

In the case where the tension F is out of the above-mentioned range, swelling, slackening and the like of a porous substrate causes poor appearance such as wrinkling on the surface of an obtained polymerelectrolyte. The tension F is preferably 0.05 or more, more preferably 0.1 or more, and preferably 2 or less, more preferably 1 or less.

In the case of coating again a coated porous substrate as described above, the coating can be performed in either state of contact with a supporting material and noncontact therewith.

A polymerelectrolyte is impregnated into voids of a porous substrate by directly applying an application solution to a porous substrate disposed on a supporting material. A polymerelectrolyte may be impregnated into voids of a porous substrate by previously applying an application solution onto a supporting material to thereafter laminate a porous substrate thereon, or a polymerelectrolyte may be impregnated into voids of a porous substrate by further applying on the other surface of a porous substrate after laminating. In the case of applying an application solution to a porous substrate, the applying may be performed again after drying, or applying and drying may be repeated plural times.

A coating solution having a contact angle of 90° or less with respect to a porous substrate is preferable by reason of having the effect of siphoning a solution of a polymerelectrolyte by a capillary phenomenon, and thus a coating solution is filled almost completely into voids of a porous membrane. As a result, coating and drying by using a coating solution of at least a required quantity provide a composite of a porous membrane wherein a polymerelectrolyte is impregnated almost completely into voids of a porous membrane, and additionally a layer comprising a polymerelectrolyte.

The required quantity of a coating solution is, for example, the quantity of a coating solution containing equal to or more than a quantity of a polymerelectrolyte equivalent to void volume existing in a porous substrate in a predetermined coating range. The void volume of a porous substrate can be calculated from thickness, coating area and apparent density of the substrate, the density of a raw material composing the substrate, and the like.

A supporting material laminated on a porous substrate includes, for example, a sheet comprising a polymer except a polymerelectrolyte of the present invention, having no ion exchange group, and other sheets made of metal and made of glass, which supporting material is not particularly limited if it is not swelled nor dissolved by the above-mentioned coating solution and a membrane obtained after being produced can be peeled thereoff. A preferable supporting material is a supporting material which can be transformed while following a membrane obtained after being produced, above all, preferably a sheet comprising the polymer except a polymerelectrolyte described in the present invention, having no ion exchange group. For example, a sheet comprising polyolefin resins such as polyethylene and polypropylene, polystyrene (PS), polycarbonate (PC), and polyethylene terephthalate (PET) is appropriately used as the above-mentioned sheet comprising a polymer not having an ion exchange group. The supporting material may be subject to releasing treatment, mirror treatment, embossing treatment, delustering treatment or the like as required.

In the case where an electrolyte membrane of the present invention is used as an electrolyte membrane for a fuel cell joined with an electrode (MEA), a carbon woven fabric and a carbon paper to which a catalyst to be used as an electrode is previously applied are preferably used as a supporting material from the viewpoint of omitting the steps of peeling a multilayer polymerelectrolyte off a supporting material and joining an electrode and the like.

In the case of laminating a supporting material as described above on a porous substrate whose one surface is coated, a supporting material may be laminated on an uncoated surface thereof, and is preferably laminated on a coated surface. Here, a supporting material coated with a coating solution can also be used, and in the case of using this, a surface of a porous substrate to be laminated may be coated or not coated, preferably not coated.

In the case of laminating a supporting material, the tension is preferably applied to also a supporting material. Tension to a supporting material is preferred to be such a tension or more as not to slacken a supporting material, which is preferred to be laminated at such a tension or less as not to be ruptured on a porous substrate into which a solution of a polymerelectrolyte is filled.

Examples of a laminating method include a method of laminating coated porous substrate and supporting material while being along a roll and a method of passing between a pair of rolls set at desired clearance.

In the present invention, after laminating the coated porous substrate and supporting material, a porous substrate and a coated porous substrate may be further laminated as required, and a laminating method thereof also includes the above-mentioned methods.

A drying method is not particularly limited if it is a method for sufficiently removing a solvent from a porous substrate coated with an application solution, for example, including an indirect heating system employing microwaves, high-frequency waves, far-infrared rays, a hot-air heater, steam, a heating furnace and the like, and a direct heating system employing a thermal transfer roll and the like. An indirect heating system by a hot-air heater and a heating furnace is preferable by reason of being inexpensive in view of equipment.

The drying is typically performed at temperatures at which a solvent can be sufficiently removed and a supporting material is not transformed.

In the case where a polymerelectrolyte is not sufficiently impregnated into voids of a porous substrate after drying and an electrolyte layer needs to be provided for an outermost layer, a solution of a polymerelectrolyte may be applied and dried again after the above-mentioned step of drying.

A polymerelectrolyte membrane of the present invention is obtained by the above-mentioned methods, and examples of the layer constitution thereof include [a composite layer/an electrolyte layer/a supporting material layer], [an electrolyte layer/a composite layer/a supporting material layer] and [an electrolyte layer/a composite layer/an electrolyte layer/a supporting material layer], and further[an electrolyte layer/a composite layer/an electrolyte layer/a composite layer/an electrolyte layer/a supporting material layer], which is a superposition of the above-mentioned layer constitution, is also one of preferable layer constitutions. Such a polymerelectrolyte membrane may be used with a supporting material peeled off in the case of being used for a fuel cell.

With regard to a polymerelectrolyte membrane, the thickness thereof is typically approximately 5 to 200 µm, preferably approximately 10 to 100 µm, and more preferably approximately 15 to 80 µm.

Next, a fuel cell employing this is described.

A fuel cell is composed in such a manner that a unit cell, which is composed of a membrane electrode assembly comprising an anode and a cathode as gaseous diffusion electrodes disposed opposite to each other and a polymerelectrolyte interposing between both of the electrodes while contacting therewith to pass ions selectively, is alternately laminated in plural pieces through a separator provided with a gas circulating means. In this fuel cell, electric power generation is performed by utilizing an electrochemical reaction caused by supplying fuels such as hydrogen, reformed gas and methanol to an anode and an oxidizing agent such as oxygen to a cathode, that is, in such a manner that the fuels are electrocatalytically oxidized and simultaneously the oxidizing agent is electrocatalytically reduced to convert chemical reaction energy directly into electric energy.

The catalyst is not particularly limited if it can activate an oxidation-reduction reaction with hydrogen or oxygen; conventional catalysts can be used and particulates of platinum are preferably used. Particulates of platinum are frequently used preferably in a state of being supported with particles of activated carbon or graphite, or with fibrous carbon.

Conventional materials can be used with regard to an electrically-conductive substance as a current collector, and porous carbon woven fabric or carbon paper is preferable in order to efficiently transport raw material gas to a catalyst.

A conventional method such as a method described in J. Electrochem. Soc.: Electrochemical Science and Technology, 1988, 135(9), 2209 can be used with regard to a method for joining platinum particulates or carbon supporting platinum particulates to porous carbon woven fabric or carbon paper and a method for joining it to a polymerelectrolyte sheet.

Figure 1:
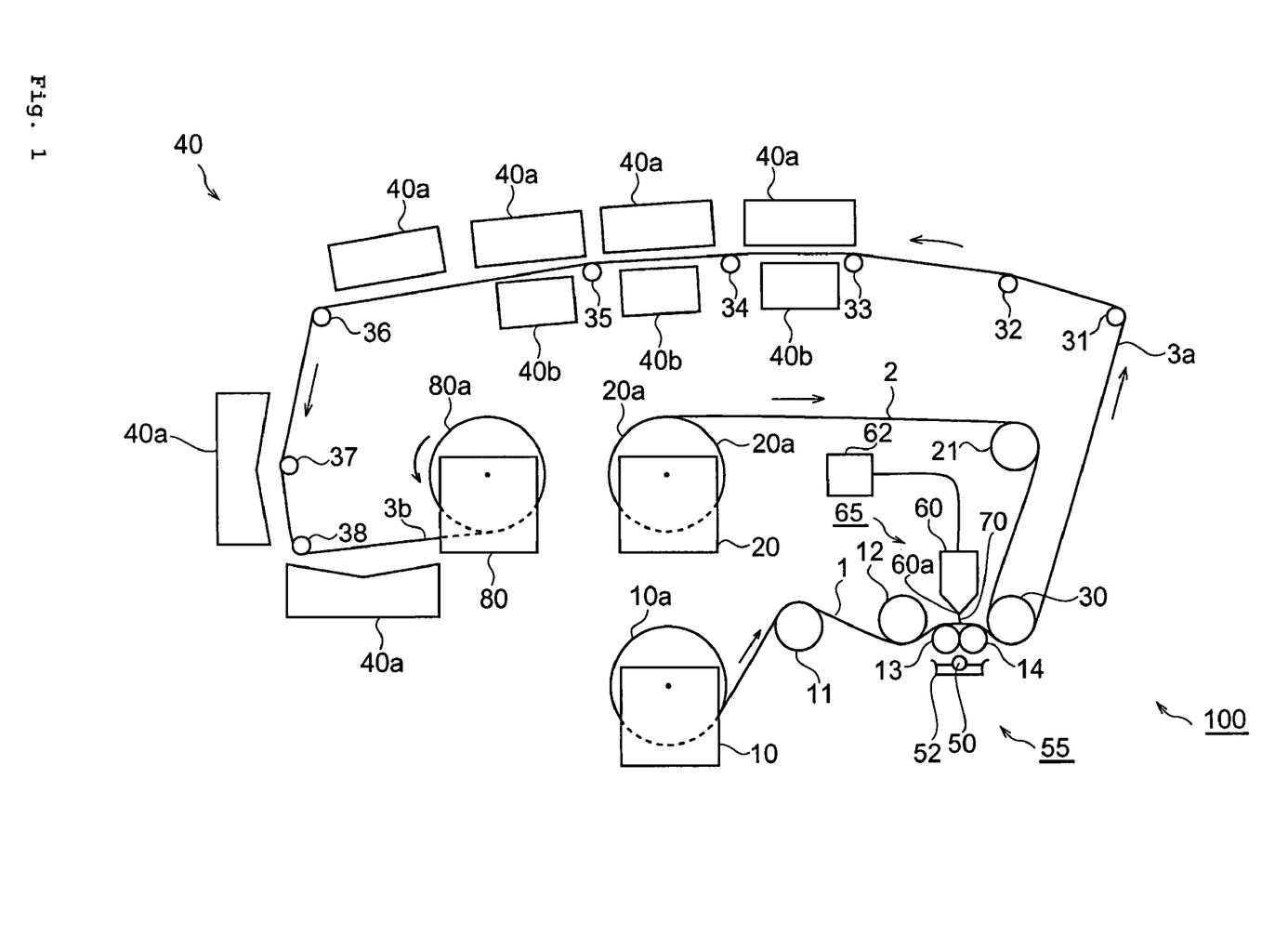
FIG. 1 is a schematic view showing an apparatus for continuously producing a polymerelectrolyte membrane, which is one of preferable embodiments of the present invention.
Figure 2:
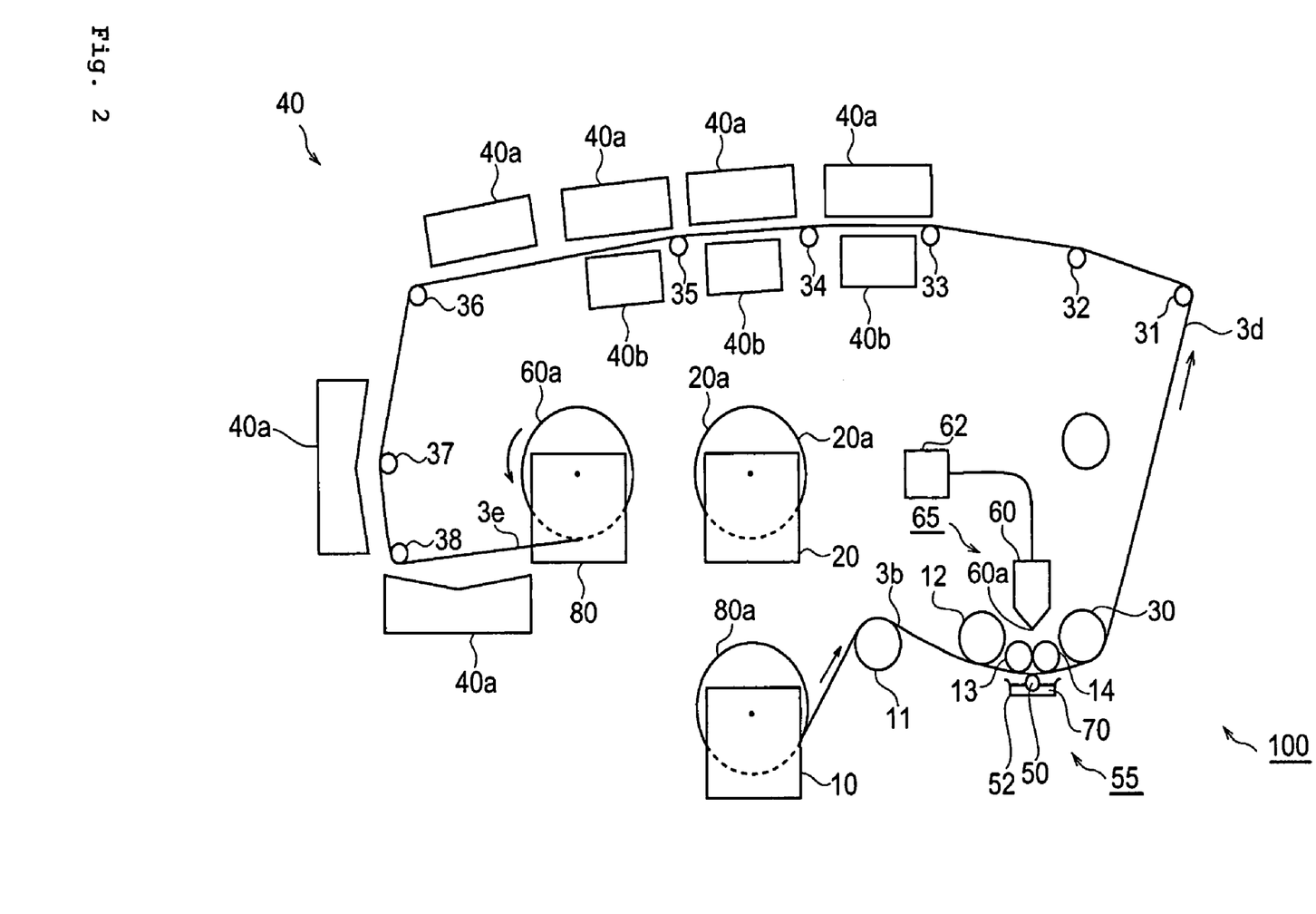
FIG. 2 is a schematic view of an apparatus for obtaining a laminate by further coating a solution of a polymerelectrolyte on the polymerelectrolyte membrane obtained by an apparatus for continuously producing illustrated FIG. 1.

Next, an apparatus for continuously producing a polymerelectrolyte membrane of the present invention is described. FIGS. 1 and 2 are schematic views showing an apparatus 100 for continuously producing a polymerelectrolyte composite membrane, which is one of preferable embodiments (a first embodiment).

This apparatus 100 for continuously producing is an apparatus for continuously producing a polymerelectrolyte membrane by coating a flexible porous substrate 1 with a solution 70 of a polymerelectrolyte to thereafter superpose on a flexible supporting material 2 and form a laminate 3a and then dry this laminate 3a.

This apparatus 100 for continuously producing has, mainly, as shown in FIG. 1, a feeder 10 for feeding the porous substrate 1, a feeder 20 for feeding the supporting material 2, a first coating unit (a first coating means) 65 for coating the porous substrate 1 fed from the feeder 10 with the solution 70 of a polymerelectrolyte, a laminating apparatus (a laminating roll in the Figure) 30 for superposing and laminating the porous substrate 1 coated with the solution 70 of a polymerelectrolyte and the supporting material 2 fed from the feeder 20 to form the laminate 3a, a drying unit (a drying means) 40 for drying the laminate 3a, and a wind-up machine 80 for winding up the dried laminate 3a.

The feeder 20 has a bobbin 20a on which the supporting material 2 is wound up, and the rotation of this bobbin 20a allows the supporting material 2 to be fed. The supporting material 2 fed from the feeder 20 is fed to the laminating apparatus 30 under the guidance of a guide roller 21.

The feeder 10 can be mounted with a bobbin 10a on which the porous substrate 1 is wound up, and the rotation of this bobbin 10a allows the porous substrate 1 to be fed. The porous substrate 1 wound out from the feeder 10 passes through the first coating unit 65 under the guidance of guide rollers 11 and 12 and is thereafter fed to the laminating means 30.

The first coating unit 65 has a pair of cylindrical horizontal rollers 13 and 14, which are disposed in a horizontal direction and are parallel to each other and can rotate around a horizontal axis, and the porous substrate 1 to be coated is hung on the upper end of each of the horizontal rollers 13 and 14, and is horizontally conveyed between these horizontal rollers 13 and 14. The first coating unit 65 has a slot die 60 for coating the porous substrate 1 horizontally conveyed by these horizontal rollers 13 and 14 with the solution 70 of a polymerelectrolyte from above.

This slot die 60 has an opening 60a of a predetermined rectangular shape extending in a width direction of the porous substrate 1 at the lower end facing the porous substrate 1. This slot die 60 pushes each predetermined quantity of the solution 70 of a polymerelectrolyte fed from a polymerelectrolyte feeding apparatus 62 out of the opening 60a to coat the porous substrate 1 in a belt-like state.

Here, with regard to the coated quantity of the solution 70 of a polymerelectrolyte to coat with, supply pressure, a shape of the opening 60a and the like are set so that a desired thickness is obtained after drying. The slot die 60 coats the porous substrate 1 before being fed to the laminating roll 30 with the solution 70 of a polymerelectrolyte.

The laminating means 30 is a body of rotation, which has a cylindrical shape and rotates around a horizontal axis, and conveys the supporting material 2 and the porous substrate 1 while being along a circumferential surface thereof to form the laminated body 3a comprising the porous substrate 1 superposed on the supporting material 2. Here, the supporting material 2 contacts with the laminating roll 30.

The above-mentioned slot die 60 applies the solution 70 of a polymerelectrolyte to a surface on the side of the porous substrate 1 contacting with the supporting material 2 in the step of laminating in the laminating roll 30.

This producing apparatus 100 is composed so that the laminate 3a is conveyed along a circumferential surface of the laminating roll 30 and thereafter passes through the drying unit 40 under the guidance of guide rollers 31, 32, 33, 34, 35, 36, 37 and 38 and then is fed to the wind-up machine 80.

The drying unit (the drying means) 40 has plural dryers 40a for blowing hot air over from the porous substrate 1 side of the laminate 3a guided by the guide rollers 31 to 38, and plural dryers 40b for blowing hot air over from the supporting material 2 side of this laminate 3a to dry the laminate 3a, thus obtaining a laminate 3b. The conveyance length in the drying unit 40 is, for example, approximately 5 to 6 m.

In the embodiment, the laminating means 30 and the guide rollers 31 to 38, which contact with the laminate 3a before completing drying, contact with the supporting material 2 side of the laminate 3a, so that the solution 70 of a polymerelectrolyte is prevented from attaching to each of the rollers.

The wind-up machine 80 has a bobbin 80a for winding up the dried laminate 3b, which is wound up by rotating this bobbin 80a at a predetermined rate. The wind-up rate is typically approximately 1 m/min, depending on the solvent to be used.

In the apparatus 100 for continuously producing a polymerelectrolyte composite membrane according to the embodiment, the feeder 10 and the feeder 20 rotate the bobbin 10a and the bobbin 20a in accordance with the wind-up action of the wind-up machine 80 as described above to send out the porous substrate 1 and the supporting material 2, respectively. Here, the feeder 10 and the feeder 20 apply a desired tension F in a conveyance direction to each of the porous substrate 1 and the supporting material 2 by adjusting rotational torque required for rotating these bobbins 110a and 20a. That is, in the embodiment, the feeder 10 and the feeder 20 perform the function of a means of applying a tension. Specifically, this tension F is, as described above, 0.01 kg/cm or more and 10 kg/cm or less, preferably 0.05 or more, more preferably 0.1 or more, and preferably 2 or less, more preferably 1 or less.

Figure 4:
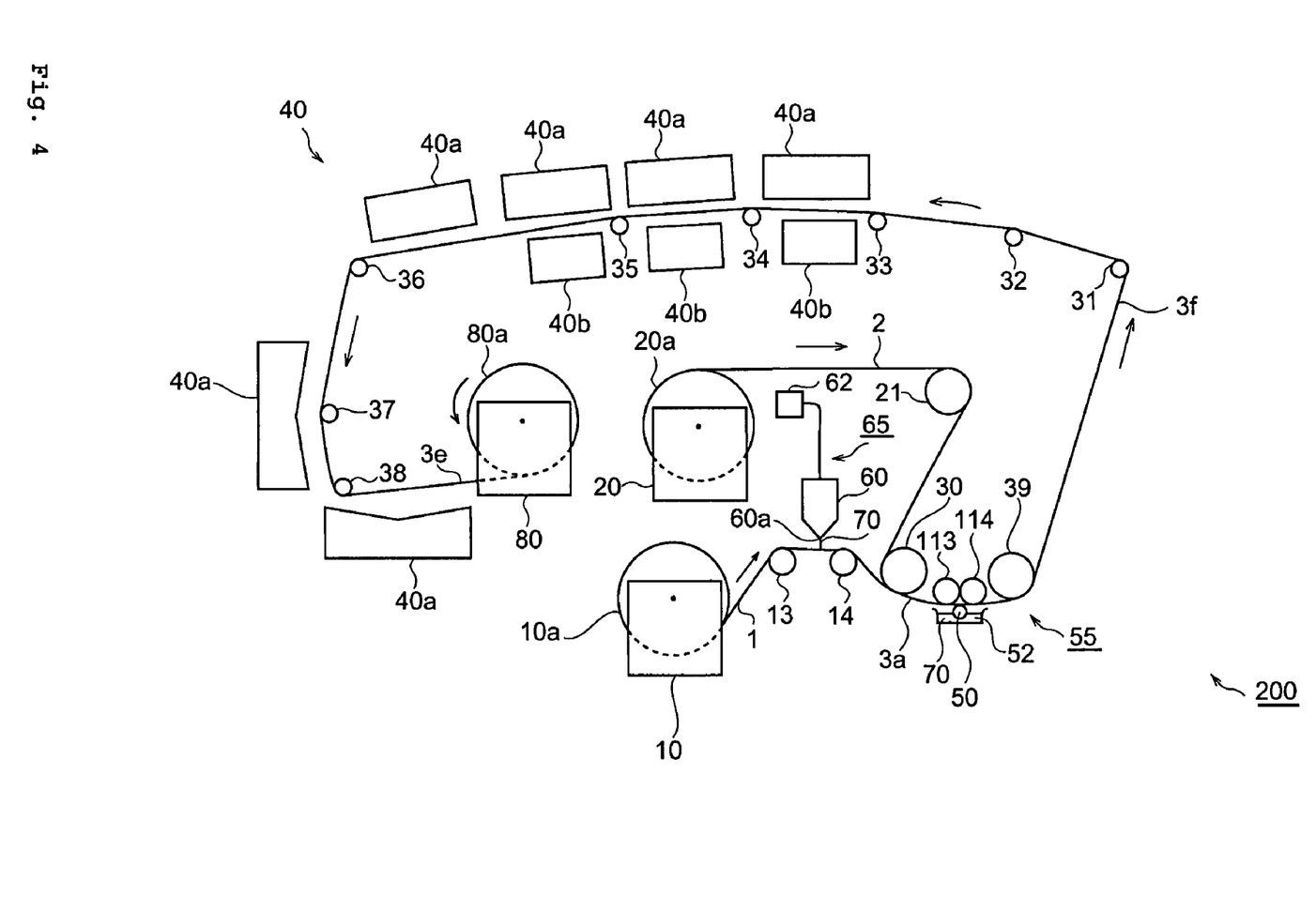
FIG. 4 is a schematic view showing an apparatus for continuously producing a polymerelectrolyte membrane, which is another preferable embodiment of the present invention.

In addition, with regard to a apparatus 200 for continuously producing of a second embodiment, as shown in FIG. 4, the bobbin 80a on which the dried laminate 3b was wound up can be mounted again on the feeder 10. The feeder 10 can feed the dried laminate 3b to the laminating means 30 through a second coating unit 55.

The second coating unit (the second coating means) 55 has the above-mentioned horizontal rollers 13 and 14 in common with the first coating unit 65. With regard to these horizontal rollers 13 and 14, the dried laminate 3b to be coated can be hung on the lower end of each of the rollers and then be horizontally conveyed. Here, the feeder 10 feeds the dried laminate 3a to the second coating unit 55 so that the side of the supporting material 2 of the dried laminate 3a contacts with the horizontal rollers 13 and 14, that is, the porous substrate 1 faces the bottom side of the Figure.

The second coating unit 55 is provided with a gravure roll 50 for coating the porous substrate 1 of the dried laminate 3b horizontally conveyed by the horizontal rollers 13 and 14 with the solution 70 of a polymerelectrolyte from below, and a pan 52 for feeding the solution 70 of a polymerelectrolyte to this gravure roll 50.

A laminate 3d further coated with the solution 70 of a polymerelectrolyte by this second coating unit 55 is wound up by the wind-up machine 80 under the guidance of the laminating means 30 and the guide rollers 31 to 38 through the drying unit 40.

Here, the laminating means 30 and the guide rollers 31 to 38, which contact with the laminate 3d, contact with the side of the supporting material 2 of the laminate 3d, so that the solution 70 of a polymerelectrolyte before drying is prevented from attaching to each of the rollers.

Next, the function in the apparatus 100 for producing is described.

As shown in FIG. 1, the top surface of the porous substrate 1 fed from the feeder 10 is coated with the solution 70 of a polymerelectrolyte from the slot die 60 of the first coating unit 65. The above-mentioned predetermined tension F is applied to this porous substrate 1 by the feeder 10. The coated surface of the porous substrate 1 to which this tension is applied is superposed on the supporting material 2 in the laminating means 30, and the porous substrate 1 and the supporting material 2 stick to each other to form the laminate 3a.

Figure 3:
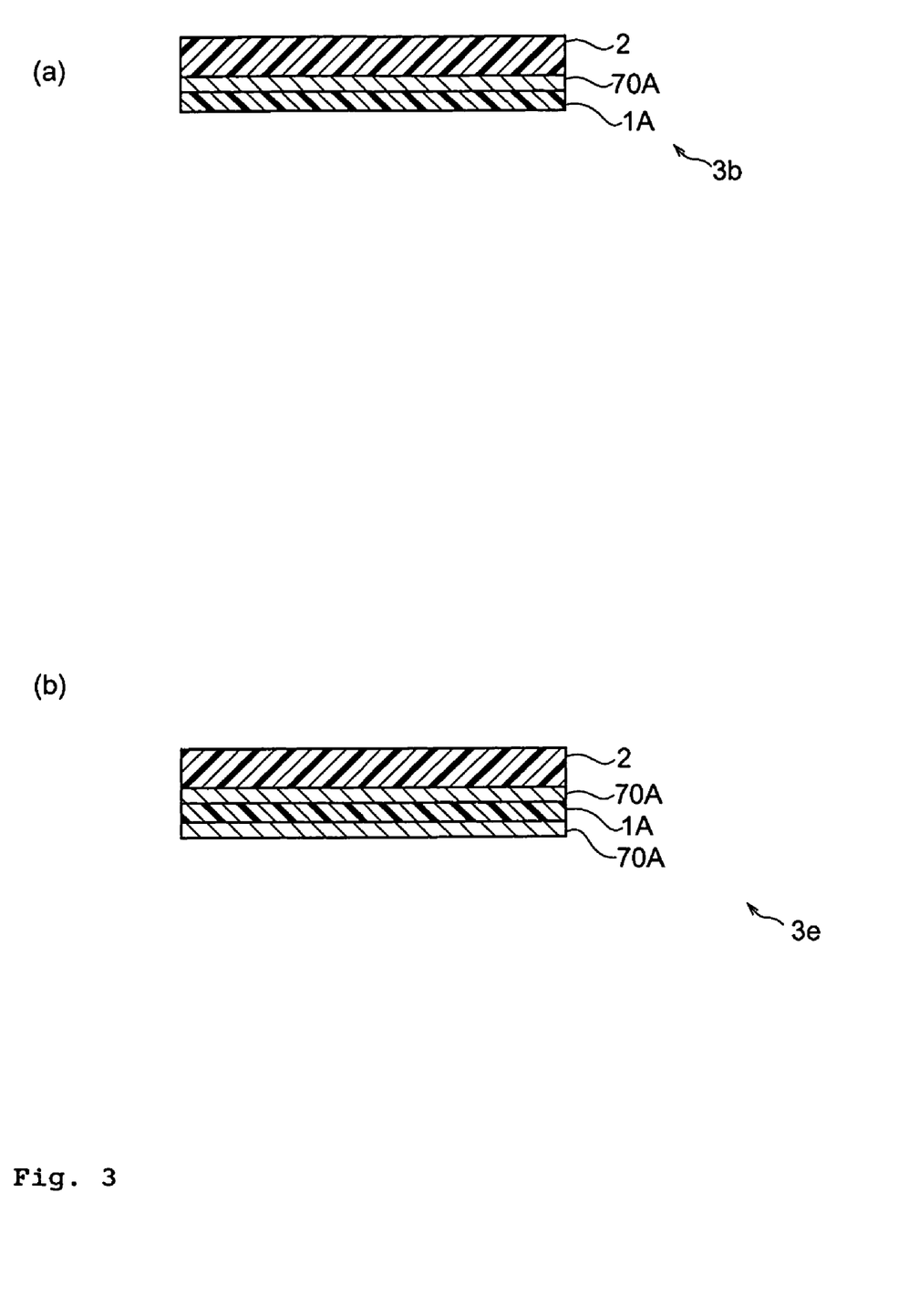

This laminate 3a is conveyed through the drying unit 40. On this occasion, a solvent in the solution 70 of a polymerelectrolyte impregnated into voids of the porous substrate 1 is removed, so that the polymerelectrolyte is filled into voids to obtain a dried porous substrate 1A and additionally a layer of the polymerelectrolyte 70 is dried and formed into a polymerelectrolyte layer 70A, and then such a dried laminate 3b is wound up on the bobbin 80a of the wind-up machine 80. This laminate 3b is a polymerelectrolyte membrane having a structure of [a composite layer/an electrolyte layer/a supporting material layer] (refer to FIG. 3(a)).

According to the embodiment, the above-mentioned predetermined tension F is applied to the porous substrate 1 coated with the solution 70 of a polymerelectrolyte, so that the porous substrate 1 and the supporting material 2 are laminated in a state such that swelling and slackening of the porous substrate 1 are sufficiently restrained, and consequently poor appearance such as wrinkling of the porous substrate 1A is reduced in the dried laminate 3b. Thus, the adoption of such a laminated body 3b as a polymerelectrolyte membrane in a fuel cell and the like as described above realizes the improvement of lifetime and the like.

The first coating unit 65 coats a surface of the porous substrate 1, on which the supporting material 2 is laminated, with the solution of a polymerelectrolyte, so that the porous substrate 1 and the supporting material 2 adhere favorably in the laminate 3a.

This apparatus 100 for producing is provided with the drying unit 40 for drying the laminate 3a, whereby mass production of the laminate 3b as a dried polymerelectrolyte membrane can be performed appropriately.

Subsequently, as shown in FIG. 2, the bobbin 80a on which the dried laminate 3b is wound up is mounted on the feeder 10, and the dried laminate 3b is hung on the lower ends of the horizontal rollers 13 and 14 so that the porous substrate 1A is on the bottom side while a desired tension is applied thereto, and additionally is conveyed to a later stage through the laminating means 30. Here, the solution 70 of a polymerelectrolyte is applied on a surface of the porous substrate 1A of the dried laminate 3b from the gravure roll 50 of the second coating unit 55, and the laminate 3d to which this solution was applied is further dried in the drying unit 40 to form the polymerelectrolyte layer 70A by the drying of the solution 70 of a polymerelectrolyte, thus forming a laminate 3e. This laminate 3e is a polymerelectrolyte composite membrane having a structure of [an electrolyte layer/a composite layer/ an electrolyte layer/a supporting material layer] (refer to FIG. 3(b)).

According to this, the second coating unit 55 for further coating the porous substrate 1A in the laminate 3b once dried with the solution of a polymerelectrolyte is provided, whereby a polymerelectrolyte membrane having a structure of [an electrolyte layer/a composite layer/an electrolyte layer/a supporting material layer] can be produced appropriately.

Next, a apparatus 200 for continuously producing a polymerelectrolyte composite membrane is described. The apparatus 200 for producing according to the embodiment differs from the apparatus 100 for producing in that the second coating unit (the second coating means) 55 coats the undried laminate 3a after being laminated in the laminating means 30 with the solution 70 of a polymerelectrolyte.

Specifically, the second coating unit 55 has a pair of horizontal rollers 113 and 114 for horizontally conveying the laminate 3a formed by the laminating means 30 while hung on the lower ends thereof. These horizontal rollers 113 and 114 are provided independently of the horizontal rollers 13 and 14 of the first coating unit 65.

The gravure roll 50 coats the laminate 3a horizontally conveyed by the horizontal rollers 113 and 114 with the solution 70 of a polymerelectrolyte from below to form a laminate 3f in which both surfaces of the porous substrate 1 are coated with the solution 70 of a polymerelectrolyte.

According to such an apparatus 200 for producing, in addition to the effect of functions in a first embodiment, a surface (the bottom side) of the porous substrate 1 in the laminate 3a, which is not coated with the solution 70 of a polymerelectrolyte, is also coated with the solution 70 of a polymerelectrolyte by the gravure roll 50, whereby a polymerelectrolyte membrane having a structure wherein [an electrolyte layer/a composite layer/an electrolyte layer/a supporting material layer] can be easily produced by one time of the step of drying. Further, the bottom surface of the porous substrate 1 is coated with the solution 70 of a polymerelectrolyte after being made into the laminate 3a, so that the effect of restraining wrinkling in the porous substrate 1 is high as compared with the case where the bottom surface of the porous substrate 1 whose top surface was coated is further coated with the solution 70 of a polymerelectrolyte before being made into the laminate 3a.

Here, in the above-mentioned embodiment, the first coating unit 65 and the second coating unit 55 are provided with the slot die 60 and the gravure roll 50 respectively, and other means than the above-mentioned coating means may be used.

In the above-mentioned second embodiment, the second coating unit 55 coats the porous substrate 1 of the laminate 3a after being laminated in the laminating roll 30 with the solution 70 of a polymerelectrolyte, and the apparatus 200 for producing can operate even though the bottom surface and the like of the porous substrate 1 whose top surface was coated in the first coating unit 65 are coated with the solution 70 of a polymerelectrolyte before being laminated in the laminating means 30.

EXAMPLES

The present invention is hereinafter described by referring to examples and is not limited thereto.

<Evaluation of Appearance of a Polymerelectrolyte Composite Membrane>

A sheet of sample having a size of 20 cm×20 cm was cut out of the central portion of a polymerelectrolyte composite membrane, and an another sheet having a size of 20 cm×20 cm was cut out of the central portion corresponding to the position as the sample previously cut out at a spot 1 m away in a wind-out direction from the spot of previously cutting out. In these two sheets of composite membrane samples, the supporting material was peeled off to confirm the number of visually observable wrinkles. A higher value thereof signifies poorer appearance, while a lower value signifies more favorable appearance.

<Thickness Unevenness>

A sheet having a size of 20 cm×20 cm was cut out of a polymerelectrolyte composite membrane, and the supporting material was peeled off to measure the thickness at intervals of 1 cm in each of MD and TD directions. An average value thereof was denoted as T, the largest value of thickness among measuring points was denoted as Tmax, and the smallest value of thickness was denoted as Tmin to calculate a value of the following expression.

(Tmax−Tmin)/T

The higher the value of this, the poorer the thickness precision, while the lower the value, the more the favorable thickness precision.

<Evaluation of Fuel Cell Performance>

A platinum catalyst supported with fibrous carbon and a porous carbon woven fabric as a current collector were joined to both surfaces of a multilayer polymerelectrolyte composite membrane off which the supporting material was peeled. Humidified oxygen gas was blown on one surface of the unit and humidified hydrogen gas on the other surface thereof to repeat the processes of operation and stop, for 1 week and measure electric power generation properties of the assembly.

<Porous Substrate and Supporting Material>

A porous membrane made of polyethylene (a membrane thickness of 14 μm, a width of 30 cm, a porosity of 57%) was used as a porous substrate, and polyethylene terephthalate (PET) manufactured by Toyobo. Co., Ltd. (COSMOSHINE A4100: a thickness of 100 μm, a width of 30 cm) was used as a supporting material.

Reference Example 1

Manufacture Example of a Polymerelectrolyte

According to a method described in Japanese Patent Application Laid-Open No. 2001-250567, a block copolymer comprising a polyether sulfone segment and a poly(2-phenyl-1,4-phenylene oxide) segment was synthesized and thereafter sulfonated.

Example 1

The sulfonated block copolymer obtained in Reference Example 1 was dissolved in N,N-dimethylacetamide so as to have a concentration of 15% by weight to prepare a solution. The viscosity η of the solution was 710 cps as a result of measuring by a BL type viscometer manufactured by Tokyo Keiki Co., Ltd. One surface of the porous membrane made of polyethylene was coated with the obtained solution so as to have a thickness of 150 μm while applying a tension of 0.1 (kg/cm) thereto by a gravure coater, and laminated in a state of the same tension on the PET to which a tension of 0.03 (kg/cm) was applied so that the coated surface side contacted with the PET, and then dried in a drying furnace set at a temperature of 80° C. to obtain a polymerelectrolyte membrane comprising (a composite layer/an electrolyte layer/a supporting material). The evaluation of appearance as well as the evaluation of fuel cell properties was performed to show the results in Table 1.

Example 2

One surface of the porous membrane made of polyethylene was coated with the solution of a polymerelectrolyte used in Example 1 so as to have a thickness of 150 μm while applying a tension of 0.1 (kg/cm) thereto by a gravure coater, and laminated in a state of the same tension on the PET to which a tension of 0.03 (kg/cm) was applied so that the coated surface side contacted with the PET, and then dried in a drying furnace set at a temperature of 80° C. After then, a surface of the porous membrane on which the PET was not laminated was coated again in the same manner and dried in a drying furnace set at a temperature of 80° C. to obtain a polymerelectrolyte membrane comprising (an electrolyte layer/a composite layer/an electrolyte layer/a supporting material). The results of evaluation were shown in Table 1.

Example 3

Both surfaces of the porous membrane made of polyethylene were coated with the solution of a polymerelectrolyte used in Example 1 so as to have a thickness of 150 μm each while applying a tension of 0.1 (kg/cm) thereto by using a gravure coater and a die, and laminated in a state of the same tension on the PET of Reference Example 2 to which a tension of 0.03 (kg/cm) was applied, and then dried in a drying furnace set at a temperature of 80° C. to obtain a polymerelectrolyte membrane comprising (an electrolyte layer/a composite layer/an electrolyte layer/a supporting material). The results of evaluation were shown in Table 1.

Comparative Example 1

Coating was conducted in the same manner as in Example 1 and directly dried in a drying furnace without being laminated on a supporting material to obtain a polymerelectrolyte membrane comprising (an electrolyte layer/a composite layer). The results of evaluation were shown in Table 1.

TABLE 1

|  | External Appearance (the number of wrinkles) | Fuel Cell Properties |
| --- | --- | --- |
| Example 1 | 0 | *1 |
| Example 2 | 0 | *1 |

TABLE 1-continued

|  | External Appearance (the number of wrinkles) | Fuel Cell Properties |
|---|---|---|
| Example 3 | 0 | *1 |
| Comparative Example 1 | 12 | *2 |

*1: Neither gas leak nor deterioration of properties was observed.
*2: Gas leak was caused and deterioration of properties was observed.

INDUSTRIAL APPLICABILITY

According to the present invention, a polymerelectrolyte composite membrane in which wrinkling and the like are suppressed and whose appearance is excellent can be continuously produced by coating a porous substrate with a solution of a polymerelectrolyte to thereafter laminate the coated porous substrate and a supporting material with the use of a roll while applying a tension F (kg/cm) in a specific range of $0.01 \leq F \leq 10$ to the coated porous substrate.

The invention claimed is:

1. A process for producing a polymer electrolyte membrane comprising the steps of:
    coating a solution of a polymer electrolyte on at least one surface of a porous substrate; and
    laminating the coated porous substrate with a supporting material while applying a tension F (kg/cm) in a conveyance direction in a range of the following expression (A)

$$0.01 \leq F \leq 10 \quad (A)$$

to the coated porous substrate.

2. The producing process according to claim 1, wherein the supporting material is laminated on a coated surface of the coated porous substrate.

3. The producing process according to claim 1, wherein a surface of the supporting material to be laminated on the porous substrate is previously coated with the solution of a polymer electrolyte.

4. The continuously producing process according to claim 1, wherein a viscosity $\eta$ (cps) of the solution of a polymer electrolyte is in a range of $5 \leq \eta \leq 5000$.

5. The producing process according to claim 1, wherein a concentration C (wt %) of the solution of a polymer electrolyte is $1 \leq C \leq 50$.

6. A polymer electrolyte membrane obtained by the process according to claim 1.

7. A fuel cell comprising the polymer electrolyte membrane according to claim 6.

* * * * *